United States Patent Office 3,803,141
Patented Apr. 9, 1974

3,803,141
10-(1-SUBSTITUTED-3-PYRROLIDYLMETHYL)
PHENOTHIAZINES
Gordon Lee De Wall, Muskegon, Mich., assignor to Burdick & Jackson Laboratories, Inc., Muskegon, Mich.
No Drawing. Filed Aug. 14, 1972, Ser. No. 280,521
Int. Cl. C07d 93/14
U.S. Cl. 260—243 A
5 Claims

ABSTRACT OF THE DISCLOSURE

The preparation of 10-(1-substituted-5-oxo-3-pyrrolidylcarbonyl)phenothiazines (I) is described. These compounds (I) are intermediates to a process for the preparation of 10 - (1-substituted-3-pyrrolidylmethyl)phenothiazines (II) by reduction of (I) with diborane in a solvent. The diborane can be generated by the reaction of sodium borohydride and boron trifluoride etherate in situ or added separately. The solvent is preferably tetrahydrofuran. The products (II) are known to be useful in controlling allergic manifestations or to control emesis and induce a tranquil state in animals. A specific compound in class (II) which is known and used is Methdilazine.

BACKGROUND OF THE INVENTION

The present invention is concerned with the preparation of 10 - (1-substituted-3-pyrrolidylmethyl)phenothiazine (II) by a novel process whereby novel 10-(1-substituted-5-oxo-3 - pyrrolidylcarbonyl)phenothiazines (I) are reduced with diborane in a solvent.

The prior art method for preparing compounds of class (II) is described in U.S. Pat. Nos. 2,826,588 and 2,945,-855. In particular, an ester of itaconic acid, particularly the dimethyl ester, is reacted with a primary lower alkyl (or aralkyl, aryl, or alkenyl) amine to produce a 1-lower alkyl - 3-carbomethoxy-5-pyrrolidinone. This amide product is reacted with lithium aluminum hydride to produce a 1-lower alkyl-3-pyrrolidylmethyl alcohol. This alcohol product is converted to the methyl halide with thionyl chloride. The methyl halide product is reacted with the 10-position secondary amino group in a phenothiazine to produce the product (II). However, application of this reaction sequence to large scale production of Methdilazine is unattractive owing to the nature and yields of the procedures involved.

SUMMARY

It is therefore an object of the present invention to provide a process for the preparation of 10-(1-substituted-3-pyrrolidylmethyl)phenothiazines (II), particularly Methdilazine, which is more economical. These compounds particularly have the formula

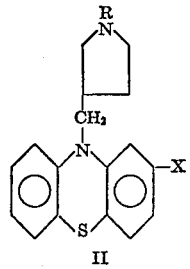

II wherein R is selected from the group consisting of lower alkyl and benzyl and wherein X is selected from the group consisting of hydrogen, lower alkoxy and halogen. It is also an object of the present invention to provide novel intermediates. These and other objects will become increasingly apparent to those skilled in the art.

The objects of the present invention are accomplished by providing a process for the preparation of a 10-(1-substituted-3-pyrrolidylmethyl)phenothiazine (II) which comprises reacting a 10-(1-substituted-5-oxo-3-pyrrolidylcarbonyl)phenothiazine (I) with excess diborane reducing agent so as to reduce the amide carbonyl groups to methylene groups and in a solvent for the reactants at a temperature allowing for reduction to (II) without splitting the pyrrolidylcarbonyl group from the phenothiazine group in (I) and without decomposition of the diborane. The novel intermediates are compounds selected from the group of 10 - (1-substituted-5-oxo-3-pyrrolidylcarbonyl)phenothiazines (I) having the formula

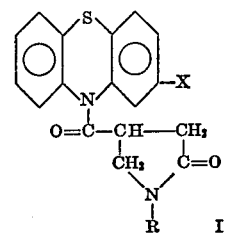

I wherein X is selected from the group consisting of hydrogen, halogen and lower alkoxy and wherein R is selected from the group consisting of lower alkyl and benzyl.

DESCRIPTION OF PREFERRED EMBODIMENTS

Unexpectedly, in the process of the present invention diborane reacts with the diamide intermediate (I) to efficiently reduce the two amide carbonyl groups to methylene groups without splitting the pyrrolidylcarbonyl group from the phenothiazine group. It had been found that relatively stronger reducing agents such as lithium aluminum hydride did in fact split the carbonyl group.

The preparation of diborane is well known to the prior art and is accomplished in the laboratory by reacting a metal hydride with a boron halide (fluoride, chloride, bromide or iodide) in an ether type solvent solution. Thermal decomposition of diborane is avoided by maintaining the temperature of the solution at less than about 35° C., preferably between about 10° C. to 20° C. The compound is available commercially and stainless steel vessels are recommended for its generation and use. Positive nitrogen pressure can be used in the reaction vessel to prevent air intrusion although generally this is not necessary with a solvent reaction. See Kirk-Othmer, vol. 3, pp. 699 to 701 (1964).

The solvents for the process are those in which diborane and the reactant amide intermediate (I) are soluble at less than about 35° C. Such solvents include tetrahydrofuran, diethyl ether or ethylene glycol dimethyl ether (glyme). In the case of the metal hydride and the boron halide reaction to produce diborane, the solvent dissolves and complexes with these reactant compounds as well.

The reactants are preferably mixed together at less than 35° C. and then the reaction mixture is allowed to warm due to the exothermic reaction of the reducing agent with the diamide intermediate (I) until the reaction is complete. The excess diborane is destroyed by acidifying the solution. The solvent is then removed and the remaining solution is neutralized with an aqueous solution of a base. The product (II) is then separated by solvent-solvent extraction from the aqueous solution using an ether solvent. It can be purified and recrystallized in a solvent for the product (II) in a conventional manner.

The preferred novel diamide intermediates (I) described above can have substituents X resistant to reduction by diborane which include hydrogen and halogens (iodo, chloro, bromo or fluoro) and lower alkoxy. R is a group resistant to the reducing action of diborane including particularly lower alkyl or with a phenyl group. "Lower" means containing 1 to 8 carbon atoms.

An overall sequence of reactions can be illustrated for the preparation of Methdilazine.

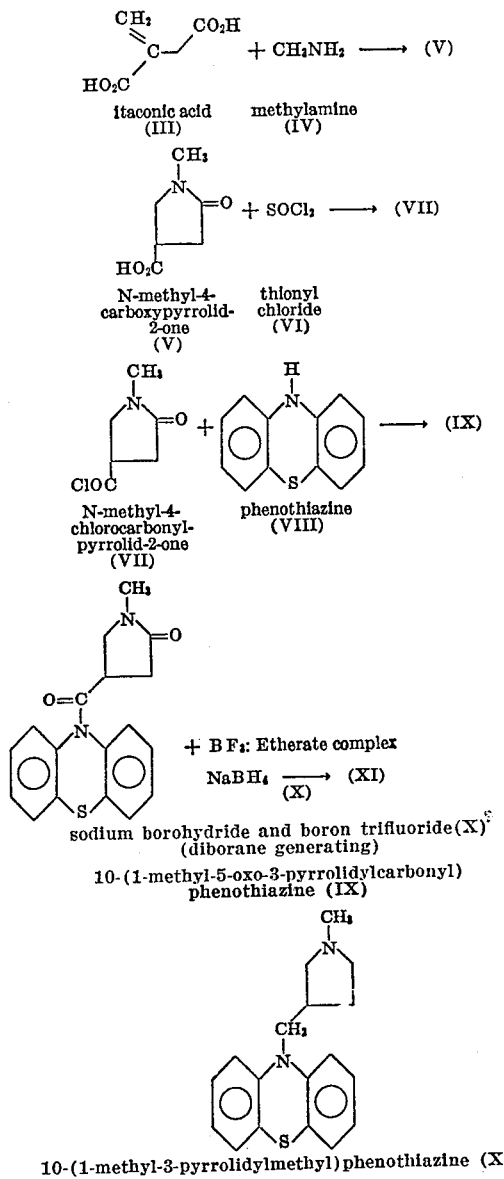

The following Examples 1 to 4 are illustrative of the process and intermediate compounds of the present invention.

EXAMPLE 1

10-(1-methyl-5-oxo-3-pyrrolidylcarbonyl)phenothiazine

In a glass 2 liter round bottom flask equipped with a thermometer, heating mantle, and distillation head with condenser a mixture of 143 grams (1.0 mole) of N-methyl-4-carboxypyrrolid-2-one (V), 867 grams of toluene, and 119 grams of thionyl chloride (VI) was stirred and slowly heated to reflux. The hydrogen chloride and sulfur dioxide by-product gases that evolved were scrubbed with caustic. The reaction mixture was refluxed for one hour and yielded a clear, amber-colored solution.

The toluene/acid chloride (VII) solution was cooled to 35° C. and charged with 192 grams of phenothiazine (VIII). The mixture was stirred and refluxed for 3 hours. The hydrogen chloride gas that is evolved was scrubbed with caustic.

The toluene was distilled off from (IX) under reduced pressure and 317 grams of acetone added to the green residue (sometimes crystalline). The mixture was stirred and refluxed for 15 minutes, then cooled and seeded with product (IX) crystals. The cooled mixture was diluted with 570 grams of ethyl ether, stirred at 15-20° for one hour, filtered and washed with 140 grams of 4:1 by volume ethyl ether:acetone and 140 grams of ethyl ether to yield after drying 210 grams of 10-(1-methyl-5-oxo-3-pyrrolidylcarbonyl)phenothiazine (IX), a gray solid identified by its infrared spectrum.

This material was sufficiently pure for the subsequent reduction step. An analytically pure sample, melting point of 158-160° C., can be obtained by a double recrystallization from aqueous acetone with carbon treatment.

Theoretical percentage: $C_{18}H_{16}N_2O_2S$.—C, 66.65; H, 4.97; N, 8.64; S, 9.88. Found (percent): C, 66.46; H, 4.76; N, 8.75; S, 9.76.

10-(1-methyl-3-pyrrolidylmethyl)phenothiazine and hydrochloride salt

A mixture of 162 grams (0.5 mole) of 10-(1-methyl-5-oxo - 3 - pyrrolidylcarbonyl)phenothiazine (IX), 1270 grams of tetrahydrofuran, and 38 grams of sodium borohydride (X) was stirred and cooled at 15° C. while slowly adding 192 grams of boron trifluoride ethyl etherate (X) over a period of one hour. After the addition was completed, the cooling bath was removed. The exothermic reaction mixture was allowed to warm up.

Alternatively, a mixture of 38 grams of sodium borohydride and 870 grams of tetrahydrofuran was stirred and cooled at 15° C. while 192 grams of boron trifluoride ethyl etherate was slowly added over a period of one hour. This mixture was then added with stirring and cooling at 15-20° C. to a mixture of 143 grams of 10-(1-methyl-5-oxo - 3 - pyrrolidylcarbonyl)phenothiazine (IX) and 400 grams of tetrahydrofuran. After the addition was complete, the exothermic reaction mixture was allowed to warm up.

After the exothermic reaction had subsided, the mixture was refluxed for one and one-half hours. The resultant slurry was cooled to 40° C. and then carefully, slowly acidified with 272 grams of 6 N hydrochloric acid. A vigorous evolution of hydrogen occurred at the beginning of the acidification process as a result of destroying the diborane. This mixture was refluxed for one and one-half hours and then further acidified with 70 grams of concentrated hydrochloric acid 20° Bé. and heated to distill off the tetrahydrofuran (1270 grams). The residue containing impure (XI) as the hydrochloride salt was diluted with 1000 grams of water, made strongly alkaline with 460 grams of 50% sodium hydroxide to neutralize the salt, and extracted twice with 535 grams of ethyl ether. The combined ethyl ether extracts were concentrated to a viscous, amber residue. This material was stirred and refluxed for one hour with 1000 grams of hexane and then filtered from the remaining insolubles through carbon and Celite to yield a clear, gold colored filtrate. This solution of XI was then used to obtain either the free base or the hydrochloride salt.

To obtain the Methdilazine free base, 700 grams of hexane was distilled off and the residual mixture was stirred and cooled to 12° C. to crystallize the product. The pale yellow crystalline solid was collected on a filter, washed with 35 grams of hexane and dried to constant weight at 40° C. to yield 75 grams of 10-(1-methyl-3-pyrrolidylmethyl(phenothiazine (XI); M.P. 87-89° C.

To obtain the Methdilazine hydrochloride, the hexane was distilled off, the residual oil dissolved in 200 grams of isopropyl alcohol and with stirring an equivalent amount of a solution of hydrogen chloride in isopropyl alcohol was added. Cooling and stirring began crystallization. When crystallization was underway, a solution of 98 grams of isopropyl alcohol and 85 grams of heptane was added with stirring. The mixture was stirred and cooled at 0° C. for 18 hours, filtered, washed twice with a solution of 24 grams of isopropyl alcohol and 21 grams heptane and dried at 70° C. to yield 75 grams of 10-(1- methyl-3-pyrrolidylmethyl)phenothiazine hydrochloride; M.P. 187–190°.

Alternative preparation of Methdilazine (XI) free base from the hydrochloride salt 30 grams of 10-(1-methyl-3-pyrrolidylmethyl)phenothiazine hydrochloride were dissolved in 145 grams of water. 48 grams of 50% sodium hydroxide were added and the liberated free base was extracted with 55 grams of toluene. The toluene extract was washed three times with 20 grams of water and then the toluene distilled off under reduced pressure. The residual oil was dissolved in 27.5 grams of heptane (or hexane) with warming. The solution was clarified via filtration, diluted with an additional 27.5 grams of heptane and stirred and cooled to 12° C. to crystallize the product. The pale yellow, crystalline product was collected on a filter, washed with 10 grams of hexane and dried to constant weight at 40° C. to yield 20 grams of 10-(1-methyl-3-pyrrolidylmethyl)phenothiazine (XI); M.P. 87–89° C.

N-methyl-4-carboxypyrrolid-2-one (V)

The starting compound (V) was prepared using the process disclosed by Paytash, P. L. et al., JACS, 72, 1415–16 (1950). A mixture of 260 grams of itaconic acid (III) and 60 grams of water was stirred and cooled while adding 160 grams of 40% monomethylamine (IV) (by weight in water) at such a rate that the temperature was kept below 35° C. After the addition was completed, the mixture was heated up to 150° C. and held at that temperature for 2 hours while 192±10 grams of water were distilled off.

The reaction mixture was cooled to 120° C. and the slow, careful addition of 391 grams of acetonitrile was begun. The pot temperature dropped and the product (V) crystallized during the acetonitrile addition. After the acetonitrile addition was complete, the mixture was reheated to reflux and then cooled to 20° C. and filtered. The cake was washed twice with 78 grams of acetonitrile and twice with 72 grams of ethyl ether to yield after drying 192 grams of N-methyl-4-carboxypyrrolid-2-one (V), a white crystalline solid identified by its infrared spectrum and melting point of 152–153° C.

EXAMPLE 2

10-(1-benzyl-5-oxo-3-pyrrolidylcarbonyl)phenothiazine

The procedure and equipment of Example 1 was used and 54.7 gms. (0.25 mole) of N-benzyl-4-carboxypyrrolid-2-one was charged into a flask with 31.4 grams of thionyl chloride and 217 grams of toluene. The mixture was heated to about 60° C. and stirred. The sulfur dioxide and hydrogen chloride by-product gases were scrubbed with sodium hydroxide. The mixture was then slowly heated to reflux which was maintained for one and one-half hours to produce a dark amber solution.

The reaction mixture was then added to a second mixture of 48 gm. phenothiazine and 87 grams of toluene and stirred and refluxed for 4 hours.

The solution was cooled and washed twice with 200 grams of water. The solution was evaporated to dryness to produce a light green crystalline solid which was then stirred with 79 grams of boiling acetone and finally diluted with 144 grams of diethyl ether. The solution was cooled to 25° C. and filtered to yield 76 grams of 10-(1-benzyl-5-oxo-3-pyrrolidylcarbonyl)phenothiazine; melting point 148–152° C. (hazy), with a clear green melt by 154° C. The purified product from recrystallization in hot acetone with activated carbon and a white solid, M.P. 153°–157° C.

Theoretical percentage: C, 71.98; H, 5.03; N, 6.99; S, 8.01. Found (percent): C, 71.84; H, 4.88; N, 6.93; S, 8.03.

10-(1-benzyl-3-pyrrolidylmethyl)phenothiazine and hydrochloride salt

The procedure of Example 1 was repeated to produce the product

N-benzyl-4-carboxypyrrolid-2-one

The procedure of Example 1 was repeated by reacting 260 gms., (2 moles) of itaconic acid with 214 gms. (2.0 moles) of benzylamine in 60 grams of water.

The reaction mixture was heated to 80° C. which was aided by heat from an exothermic reaction to produce a gold-colored solution. The solution was stirred and heated to distill off the water. The mixture was heated to 225° C. and a total of 90 grams water was collected.

The solution was cooled to about 150° C. and 391 grams of acetonitrile was slowly added which reduced the temperature of the mixture to about 70° C. The solution was seeded and a precipitate formed as the temperature rose to about 85° C. The solution was then cooled to about 25° C. with stirring. The product was filtered and washed twice with 78 grams of acetonitrile and 214 grams of diethyl ether to yield 381 grams of N-benzyl-3-carboxypyrrolid-2-one, white crystalline solid. The melting point was 143°–144° C. with softening at 142° C.

EXAMPLE 3

10-(1-ethyl-5-oxo-3-pyrrolidylcarbonyl)phenothiazine

The procedure of Example 1 was used with 39.2 (0.25 mole) of N-ethyl-4-carboxypyrrolid-2-one, 217 grams of toluene and 31.4 grams of thionyl chloride. The product was then reacted with 48.0 gms. of phenothiazine in 87 grams of toluene. The product was a greenish-amber oil which would not easily crystallize from acetone and ether. The oil slowly crystallized on long standing and was then triturated with 20 grams of acetone and was washed with hot 35 grams of ethyl ether. The crystalline product was filtered and then washed with 50 ml. of a 3:1 by volume mixture of diethyl ether and acetone and again with diethyl ether alone. The cream-gray material weighed 46 grams and had a melting point of 109–112° C.

10-(1-ethyl-3-pyrrolidylmethyl)phenothiazine and hydrochloride salt

The procedure of Example 1 was repeated to produce the product.

N-ethyl-4-carboxypyrrolid-2-one

The procedure of Example 1 was repeated by reacting 260 grams (2.0 moles) of itaconic acid in 60 grams of water with ethylamine (130 gms. of 70% in water, 2 moles) over a period of 15 minutes with cooling to maintain the temperature at less than about 35° C. The mixture was heated to reflux and the water was distilled off. The product was obtained as white solid weighing 187 grams and which melted between 97.5–100° C.

EXAMPLE 4

10-(1-methyl-5-oxo-3-pyrrolidylcarbonyl)-2-chlorophenothiazine

The procedure of Example 1 was repeated except that 35.7 gms. (0.25 mole) 2-chlorophenothiazine was used in place of phenothiazine. The product was a gray-white solid which weighed 71 grams which had a melting point of 155°–158° C. The recrystallized product melted at 157–159° C. with shrinking at 156° C.

Theoretical percentage: $C_{18}H_{15}N_2ClO_2S$.—C, 60.25; H, 4.21; N, 7.81; Cl, 9.88; S, 8.93. Found (percent): C, 60.06; H, 4.24; N, 7.63; Cl, 9.68; S, 9.06.

I claim:
1. A compound selected from the group of 10-(1-R-substituted-5-oxo-3-pyrrolidylcarbonyl)phenothiazines having the formula

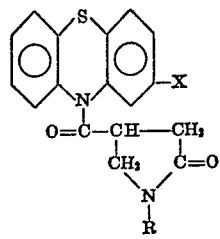

wherein X is selected from the group consisting of hydrogen, halogen and lower alkoxy and wherein R is selected from the group consisting of lower alkyl and benzyl.

2. The compound of claim 1 which is 10-(1-methyl-5-oxo-3-pyrrolidylcarbonyl)phenothiazine.
3. The compound of claim 1 which is 10-(1-benzyl-5-oxo-3-pyrrolidylcarbonyl)phenothiazine.
4. The compound of claim 1 which is 10-(1-ethyl-5-oxo-3-pyrrolidylcarbonyl)phenothiazine.
5. The compound of claim 1 which is 10-(1-methyl-5-oxo-3-pyrrolidylcarbonyl)-2-chlorophenothiazine.

References Cited

Brown et al.: J. Am. Chem. Soc., vol. 86, pu. 3566–67 (1964).

Bissell et al.: J. Org. Chem., vol. 24, pp. 1256–59, (1959).

HARRY I. MOATZ, Primary Examiner